J. V. WOOLSEY.
Wheels for Vehicles.

No. 156,449. Patented Nov. 3, 1874.

Witnesses:
A. F. Cornell
John C. Gore

Inventor:
J. V. Woolsey
Per Burridge & Co.
Attys.

UNITED STATES PATENT OFFICE.

JOHNSTON V. WOOLSEY, OF SANDUSKY, OHIO.

IMPROVEMENT IN WHEELS FOR VEHICLES.

Specification forming part of Letters Patent No. 156,449, dated November 3, 1874; application filed May 16, 1874.

*To all whom it may concern:*

Be it known that I, JOHNSTON V. WOOLSEY, of Sandusky, in the county of Erie and State of Ohio, have invented a certain new and Improved Carriage-Wheel, of which the following is a full, clear, and complete description, reference being had to the accompanying drawings, making a part of this specification, in which—

Figure 1:
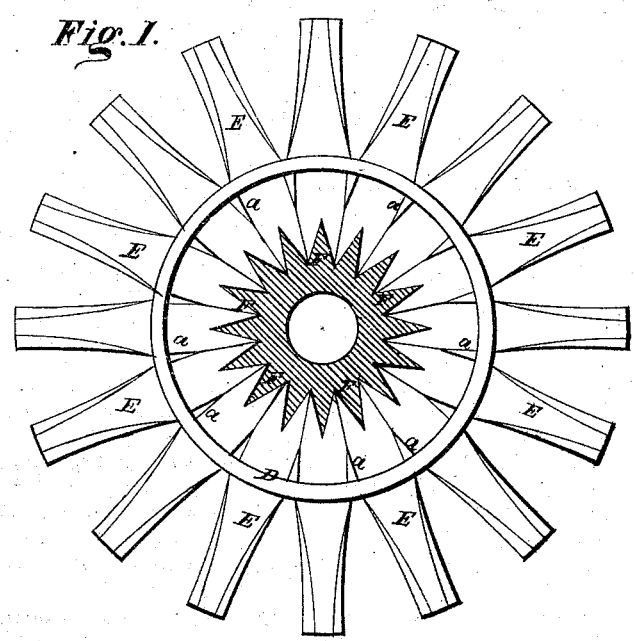
Figure 2:
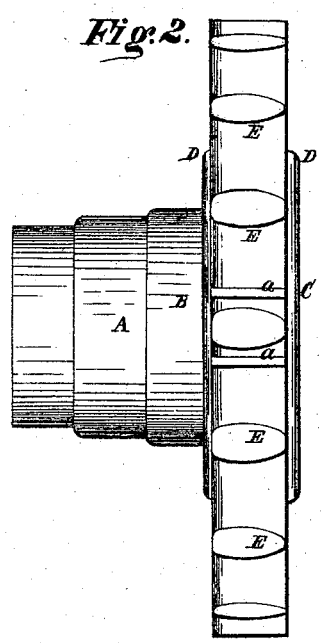
Figure 3:
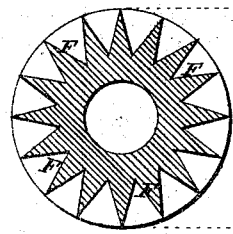
Figure 3:
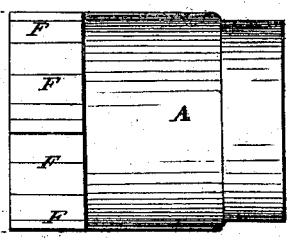
Figure 4:
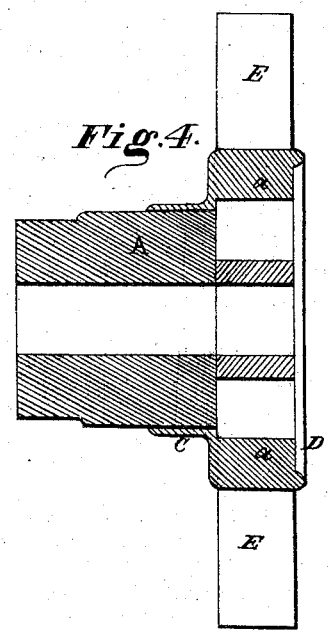

Figure 1 is an end view of the hub, a section of which is cut away in order to show the tongues or tenons of the hub, and the mortises in the ends of the spokes, into which the tongues or tenons are received. Fig. 2 is a side view of Fig. 1. Fig. 3 is a detached view of the hub. Fig. 4 is a transverse longitudinal section.

Like letters of reference refer to like parts in the several views.

The nature of this invention relates to a carriage-wheel, the peculiar construction of which is as follows:

In the drawings, A represents the hub, to the middle of which is fitted a band. Said band consists of two rings, B C, and collars D D', connected to each others by the bars *a*, Fig. 1. In the spaces between the bars the ends of the spokes are inserted, and thereby braced and supported in their connection with the hub. A section of the ring C, also a section of the hub, is represented as cut away transversely so that the connection of the spokes E with the hub may be seen.

The connection of the spokes with the hub is made as follows: In the periphery of the hub are formed tongues or tenons F, Figs. 1 and 3, the number whereof are according to the number of spokes used in the wheel. In the end of each of the spokes is cut a notch or mortise corresponding in size and shape to the tongues or tenons F of the hub, which, when the spokes are driven down through the band to the hub, the tongues or tenons fit closely into the notches in the ends of the spokes, as shown in Fig. 1.

By this means the ends of the spokes are secured firmly in the wooden hub, and strongly braced and supported by the collars D of the band, and the connecting-bars *a* thereof, thereby making a strong and substantial wheel.

A wheel constructed as above described has a considerable thickness of material around the hole in which the axle-box is inserted, thereby increasing the strength of that part of the hub. It also allows of different-sized boxes to be used, so that the axles may be much larger in proportion to the hubs. The ends of the spokes, also, have a large bearing-surface, one against the other, and therefore mutually strongly brace and support each other.

I am aware that grooved or serrated spokes, at the ends, have been known and used, and which are not claimed; but I am not aware of a wooden hub with tongues upon its periphery, and having spokes with mortised ends fitted to the hub.

What I claim as my invention, and desire to secure by Letters Patent, is—

The wooden hub A, having formed in its periphery radial points F, spokes E, having cut in their ends notches corresponding in shape and size to fit the radial points F of the hub, in combination with a band consisting of the rings B C and collars D D', said rings and collars being connected by radial bars *a*, between which the spokes are inserted, substantially as and for the purpose set forth.

JOHNSTON V. WOOLSEY.

Witnesses:
JOHN C. GONE,
J. H. BURRIDGE.